(12) United States Patent
Okuhara

(10) Patent No.: US 6,825,416 B2
(45) Date of Patent: Nov. 30, 2004

(54) GROMMET FOR A WIRE HARNESS

(75) Inventor: Takashi Okuhara, Yokkaichi (JP)

(73) Assignee: Sumitomo Wiring Systems, Ltd., Yokkaichi (JP)

( * ) Notice: Subject to any disclaimer, the term of this patent is extended or adjusted under 35 U.S.C. 154(b) by 0 days.

(21) Appl. No.: 10/824,444

(22) Filed: Apr. 15, 2004

(65) Prior Publication Data

US 2004/0206538 A1 Oct. 21, 2004

(30) Foreign Application Priority Data

Apr. 18, 2003 (JP) ........................................ 2003-114388

(51) Int. Cl.$^7$ ............................................... H01B 17/26
(52) U.S. Cl. ............................. 174/65 G; 174/153 G; 174/151; 174/152 G; 174/152 R; 16/2; 248/56; 277/178
(58) Field of Search ......................... 174/65 G, 153 G, 174/151, 152 G, 152 R; 16/2; 248/56; 277/178

(56) References Cited

U.S. PATENT DOCUMENTS

| | | | |
|---|---|---|---|
| 4,959,509 A | * | 9/1990 | Takeuchi et al. ............ 277/606 |
| 5,353,472 A | * | 10/1994 | Benda et al. ................. 16/2.2 |
| 5,452,494 A | * | 9/1995 | Wright ......................... 16/2.2 |
| 5,739,475 A | * | 4/1998 | Fujisawa et al. ........ 174/153 G |
| 5,856,635 A | * | 1/1999 | Fujisawa et al. ........ 174/153 G |
| 6,058,562 A | | 5/2000 | Satou et al. |
| 6,495,767 B2 | | 12/2002 | Okuhara et al. |
| 6,603,078 B2 | | 8/2003 | Okuhara et al. |

FOREIGN PATENT DOCUMENTS

JP    2003-032855    1/2003

OTHER PUBLICATIONS

English Language Abstract of JP 2003-032855.

* cited by examiner

Primary Examiner—Chau N. Nguyen
Assistant Examiner—Anton Harris
(74) Attorney, Agent, or Firm—Greenblum & Bernstein, P.L.C.

(57) ABSTRACT

The invention relates to a grommet having an axis and configured to contain a wire harness and insertable into a through-hole formed in a vehicle panel. The grommet includes a tubular portion and a funnel-shaped portion, the latter including, sequentially from the tubular portion, a narrowed end section, a frusto-conical wall with external and internal faces, and an enlarged end section that includes an external face provided with a circular groove portion. The circular groove portion forms a circular ridgeline at a position nearest to the tubular portion. The frusto-conical wall includes a thin wall section having a substantially uniform thickness and extending from the narrowed end section up to a position about half way position along the axis in the frusto-conical wall, and a thick wall section having a substantially uniform internal radius and extending from the about half way position to and through the enlarged end section along the axis. The external face of the frusto-conical wall includes a plurality of shallow recesses which are arranged at given intervals therebetween around the circular direction and which extend from the narrowed end section towards the circular ridgeline, the shallow recesses leading to deep recesses near the circular ridgeline, whereby protrusions are formed adjacent to the shallow and deep recesses.

20 Claims, 10 Drawing Sheets

PRIOR ART

GROMMET FOR A WIRE HARNESS

BACKGROUND OF THE INVENTION

1. Field of the Invention

The present invention relates to a grommet, and in particular to a grommet for mounting on a wire harness used in vehicles. After being mounted on its wire harness, the grommet is inserted into a through-hole formed in a vehicle body panel. The grommet of the invention thus secures the protection of the wire harness, as well as providing water and dust sealing at the periphery of the through-hole.

2. Description of Background Information

A wire harness passing from the vehicle engine compartment to the passenger compartment is commonly equipped with a grommet. Such a grommet is mounted into a through-hole formed in the body panel that separates the passenger compartment from the engine compartment. The grommet thus protects the wire harness placed in the through-hole, and further prevents water, dust and noise from entering into the passenger compartment from the engine compartment.

These grommets are preferably capable of being installed into the through-hole with reduced pushing force and of being held therein firmly after their installation.

A variety of grommets of this type have been proposed until now, including that disclosed in patent document JP-A-2003-32855 (see FIG. 1).

The grommet 1 shown in FIG. 1 includes a funnel-shaped portion 2 having a narrowed end (having a smaller diameter) and an enlarged end (having a larger diameter), and a tubular portion 3 which extends from the narrowed end of the funnel-shaped portion 2.

A circular groove 4 is provided on the external face near the enlarged end of the funnel-shaped portion 2. The circular groove portion 4 can engage with the rim of a receiving hole formed in the body panel. The circular groove portion 4 includes a groove 4a, a first groove wall section 4b located so as to face the narrowed end and a second groove wall section 4c located so as to face the enlarged end.

A wire harness W/H is then passed through the grommet 1 from the side of tubular portion 3 and into the internal space of the funnel-shaped portion 2. The tubular portion 3 is then wrapped with a tape T.

When installing the grommet 1 into the through-hole H in the body panel P, the tubular portion 3 of the grommet 1 is inserted into the through-hole H from the engine compartment side. When the funnel-shaped portion 2 comes into contact with the circular rim of the through-hole H, it is forcibly pushed, so that the funnel-shaped portion 2 is squashed inwardly and passed into the through-hole H. After the passage, the circular groove portion 4 of the grommet 1 engages with the through-hole H of the body panel P, such that the body panel is firmly held from both sides by the first and second groove wall sections 4b and 4c.

Further, the portion adjacent to the first groove wall section 4b is made thicker than the frusto-conical wall section of the funnel-shaped portion 2, so that the grommet 1 can be held more firmly when engaged with the body panel P.

However, the thickened portion of the above grommet 1 tends to resist to squashing when installed into the through-hole H, thus requiring a stronger insertion force and making the mounting operation more difficult.

If the first groove wall section 4b is made thinner to avoid such problem, although the insertion force shall be lowered, the grommet will be held less firmly once installed.

An object of the invention is to provide a grommet which can be engaged with the body panel with a reduced force, while being held therein with sufficient force.

SUMMARY OF THE INVENTION

To this end, there is provided a grommet with an axis adapted to contain a wire harness and insertable into a through-hole formed in a vehicle panel, the grommet including a tubular portion and a funnel-shaped portion, the latter including, sequentially from the tubular portion, a narrowed end section, a frusto-conical wall with external and internal faces, and an enlarged end section that includes an external face provided with a circular groove portion, wherein:

the circular groove portion forms a circular ridgeline at a position nearest to the tubular portion, the frusto-conical wall includes a thin wall section having a substantially uniform thickness and extending from the narrowed end section up to about half way position along the axis in the frusto-conical wall, and a thick wall section having a substantially uniform internal radius and extending from the half way position to and through the enlarged end section along the axis; and the external face of said frusto-conical wall includes a plurality of shallow recesses which are arranged at a given interval therebetween around the circular direction and which extend from the narrowed end section towards the circular ridgeline, the shallow recesses leading to deep recesses near the circular ridgeline, whereby protrusions are formed adjacent to the shallow and deep recesses.

Preferably, each of the deep recesses has a base extending substantially parallel to the axis and an end wall rising substantially perpendicularly to the axis.

Preferably still, each of the shallow recesses has substantially the same width along the extending direction, whereby each of the protrusions has a width narrowing towards the tubular portion.

Preferably yet, the circular groove portion has a circular wall which inclines from the circular ridgeline radially inwardly in the direction going away from the tubular portion.

Suitably, the enlarged end section has an end face having a central opening with a peripheral rim; from the rim extends a second tubular portion which has a determined length and includes a corrugated section along the length, and an end section; from the end section extends a second funnel-shaped portion having a narrowed end section and an enlarged end section having an external face; and wherein the external face is provided with a second circular groove portion, whereby the grommet can contain a wire harness wired between two body panels.

The invention also relates to a wiring harness including a group of electrical wires and at least one grommet surrounding a length portion of the group, the grommet including an axis adapted to contain a wire harness and insertable into a through-hole formed in a vehicle panel, the grommet including a tubular portion and a funnel-shaped portion, the latter including, sequentially from the tubular portion, a narrowed end section, a frusto-conical wall with external and internal faces, and an enlarged end section that includes an external face provided with a circular groove portion, wherein:

the circular groove portion forms a circular ridgeline at a position nearest to the tubular portion, the frusto-conical wall includes a thin wall section having a substantially uniform thickness and extending from the narrowed end section up to about half way along the axis in the frusto-conical wall, and a thick wall section having a substantially uniform internal radius and extending from the half way position to the enlarged end section along the axis; and the external face of the frusto-conical wall includes a plurality of shallow recesses which are arranged at a given interval therebetween around the circular direction and which extend from the narrowed end section towards the circular ridgeline, the shallow recesses leading to deep recesses near the circular ridgeline, whereby protrusions are formed adjacent to the shallow and deep recesses.

Preferably, the enlarged end section has an end face having a central opening with a peripheral rim; from the rim extends a second tubular portion which has a determined length and includes a corrugated section along the length, and an end section; from the end section extends a second funnel-shaped portion having a narrowed end section and an enlarged end section having an external face; and wherein the external face is provided with a second circular groove portion, whereby the grommet can contain a wire harness wired between two body panels.

The invention further relates to a method of providing a sealed passage for a wire harness through a panel, including:

forming a through-hole in the panel at a location where the sealed passage is to be provided, the through-hole having rim, providing a grommet having an axis adapted to contain the wire harness and insertable into a through-hole formed in a vehicle panel, the grommet including a tubular portion and a funnel-shaped portion, the latter including, sequentially from the tubular portion, a narrowed end section, a frusto-conical wall with external and internal faces, and an enlarged end section that includes an external face provided with a circular groove portion, wherein:

the circular groove portion forms a circular ridgeline at a position nearest to the tubular portion, the frusto-conical wall includes a thin wall section having a substantially uniform thickness and extending from the narrowed end section up to about half way position along the axis in the frusto-conical wall, and a thick wall section having a substantially uniform internal radius and extending from the half way position to the enlarged end section along the axis; and the external face of the frusto-conical wall includes a plurality of shallow recesses which are arranged at a given interval therebetween around the circular direction and which extend from the narrowed end section towards the circular ridgeline, the shallow recesses leading to deep recesses near the circular ridgeline, whereby protrusions are formed adjacent to the shallow and deep recesses, passing the wire harness through the axis of the grommet, passing the grommet into the through-hole from a face of the panel, with the tubular portion entering first, until the circular groove portion engages with the rim.

Suitably, the method further includes:

providing the enlarged end section with an end face having a central opening with a peripheral rim, wherein;

from the rim extends a second tubular portion which has a determined length and includes a corrugated section along the length, and an end section; from the end section extends a second funnel-shaped portion having a narrowed end section and an enlarged end section having an external face; and providing the external face with a second circular groove portion, whereby the grommet can contain a wire harness wired between two body panels.

BRIEF DESCRIPTION OF THE DRAWINGS

The above, and the other object, features and advantages of the present invention will be made apparent from the following description of the preferred embodiments, given as non-limiting examples, with reference to the accompanying drawings, in which.

DETAILED DESCRIPTION OF THE PREFERRED EMBODIMENTS

FIGS. 2 to 7 show a first embodiment of the invention.

The grommet 10 of the first embodiment is integrally formed of any suitable material, such as rubber or elastomer. The grommet 10 includes a funnel-shaped portion 12 having a frusto-conical wall section with narrowed and enlarged ends. A first tubular portion 11 extends outwardly from the narrowed end of the funnel-shaped portion 12, and a circular groove portion 13 is provided on the external face of the enlarged end.

Figure 1:
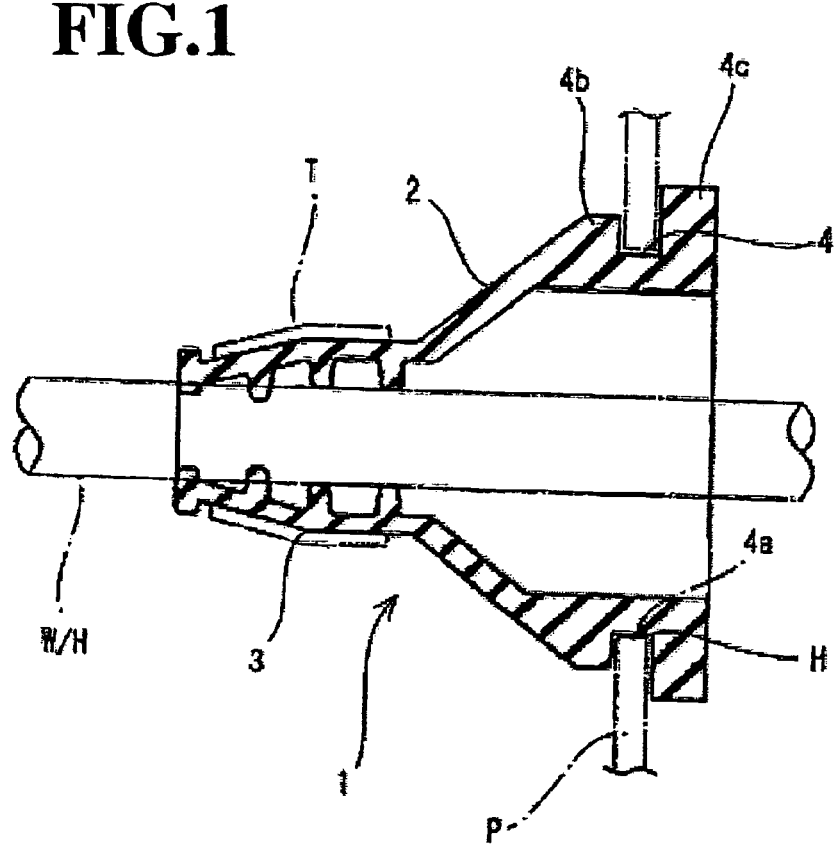
FIG. 1 is a side view of a grommet of the prior art, shown encircling a wire harness.
Figure 2:
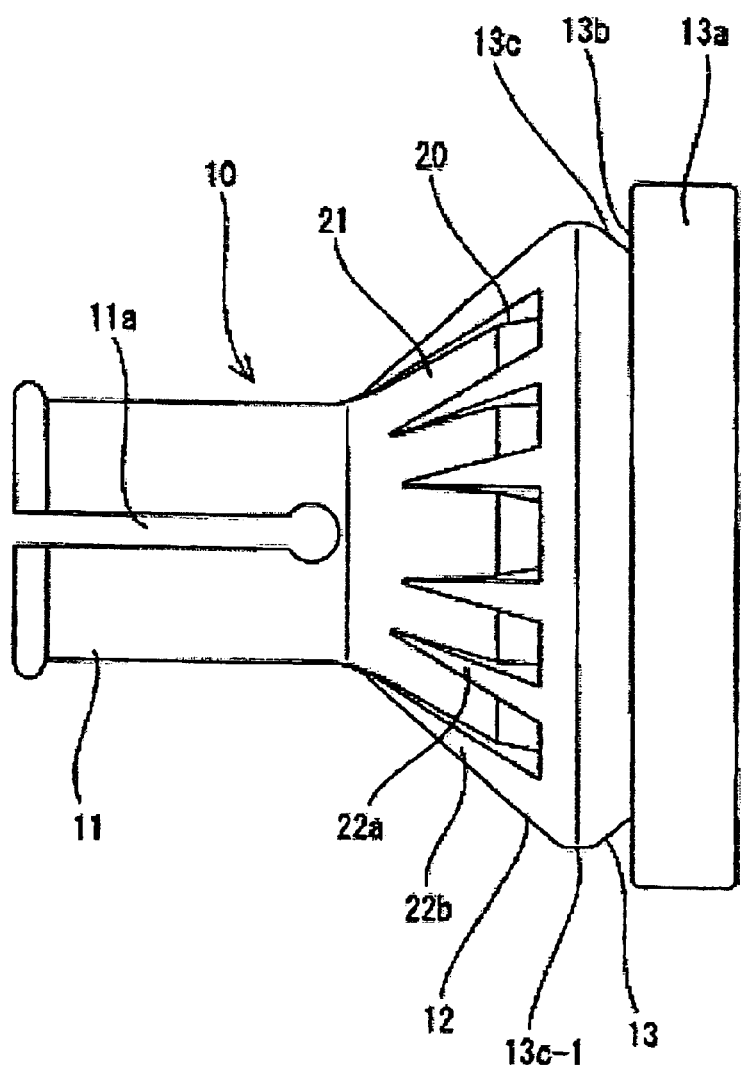
FIG. 2 is a side view of a grommet according to a first embodiment of the present invention.
Figure 3:
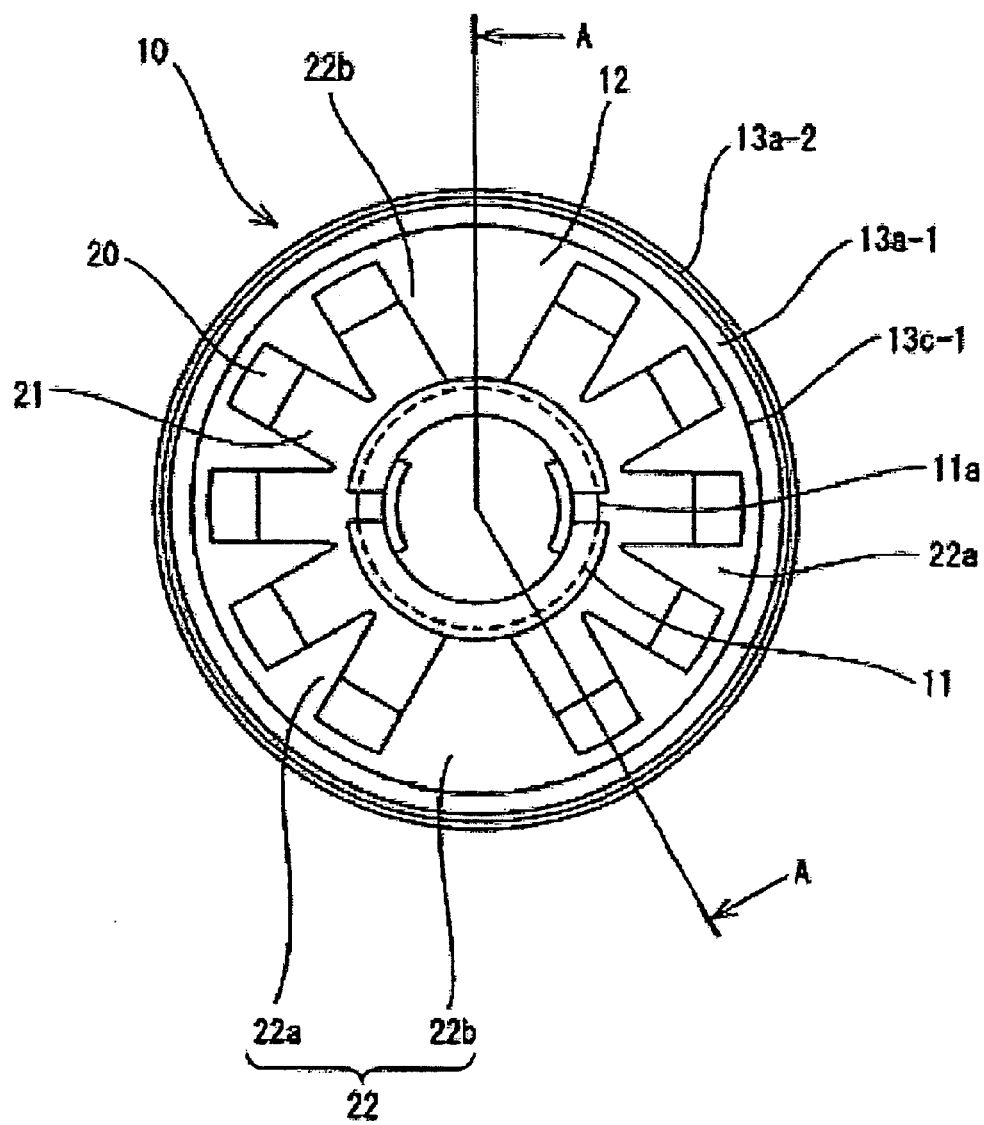
FIG. 3 is a front view of the grommet of FIG. 2, taken from the side of the tubular portion.

As shown in FIGS. 2 and 3, one or several elongate recesses 20, 21 having substantially the same width are formed to spread along the external face 12a of the frusto-conical wall section of the funnel-shaped portion 12. Each of the elongate recesses has a shallow recess 21 and a deep recess 20. The shallow recess 21 extends towards the narrowed end of the funnel-shaped portion 12, whilst the deep recess 20 extends towards the enlarged end thereof. The deep recess 20 has a base extending substantially parallel to the axis of the funnel-shaped portion 12, and a wall extending substantially perpendicularly to that axis, thereby forming a substantially L-shaped cross section on the plane including the axis. The portion of the funnel-shaped portion 12 not occupied by the elongate recesses in the external face 12a forms protrusions 22 arranged radially at given intervals around the circumference. Viewed on the plane perpendicular to the funnel axis and defined into two parts by a diametrical line A—A (see FIG. 3), a first half zone may include e.g. a first group of 4 narrow protrusions 22a and a second half zone a second group of 4 narrow protrusions 22a. Then, these two groups may have two large protrusions 22b between them. Viewed from the top, as shown is in FIG. 3, the narrow protrusions 22a may form a triangular wedge going towards the tubular portion 11 to merge with the tubular portion 11, whereas the large protrusions 22b may form a substantially trapezoidal shape going towards the tubular portion 11 and joining the latter.

The enlarged end section of the funnel-shaped portion 12 is provided with a circular groove portion 13 which includes a first circular wall section 13a at, or near, the enlarged end, a circular groove 13b and a second circular wall section 13c. The first circular wall section 13a has a circular wall which rises perpendicular to the grommet axis in the radial direction. The second circular wall section 13c has a circular ridgeline 13c-1 and is concentrically tapered from that ridgeline towards the first circular wall section 13a. Likewise, the second circular wall section 13c is concentrically tapered from that ridgeline towards the tubular portion 11, so that the radius of the external face 12a of the funnel-shaped portion 12 decreases gradually when going towards the tubular portion 11. Therefore, such an external face 12a forms the same surface as that of the protrusions 22. Further, as shown in FIG. 4, the perpendicular circular wall 13a-1 of the first circular wall section 13a is provided with a circular sealing lip 13a-2 at, or near, the external face of that wall section 13a.

Figure 4:
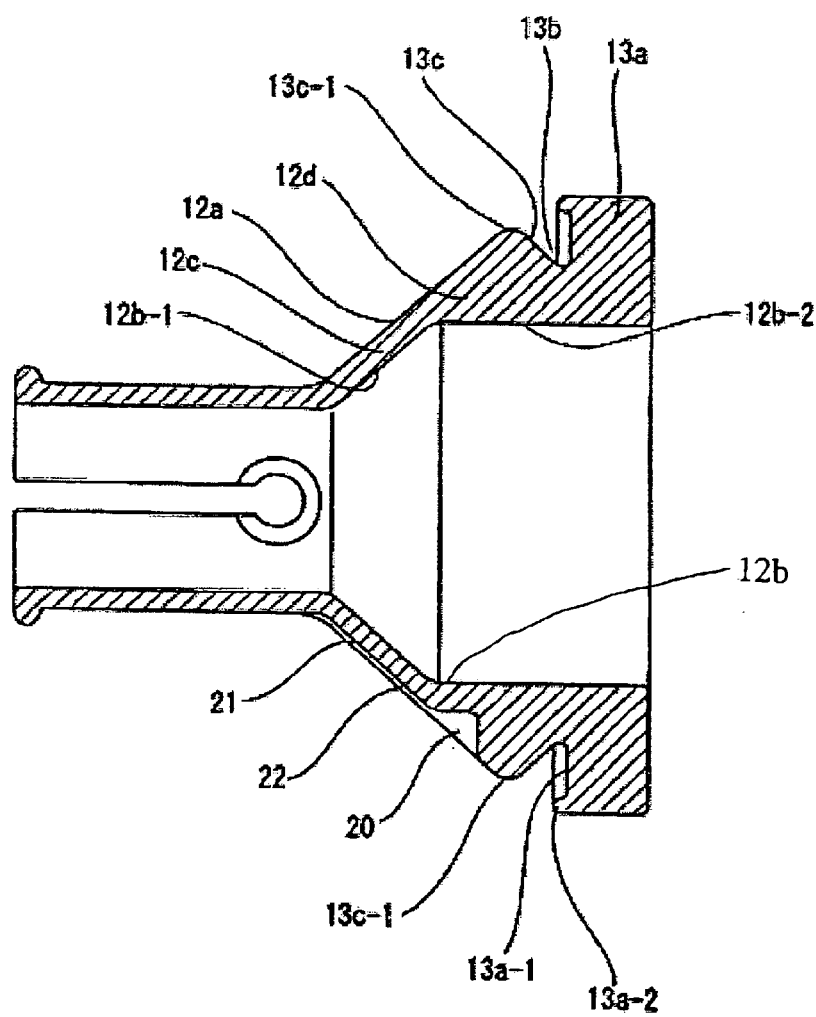
FIG. 4 is a cross-sectional side view of the grommet of FIG. 2, taken along line A—A in FIG. 3.
Figure 5:
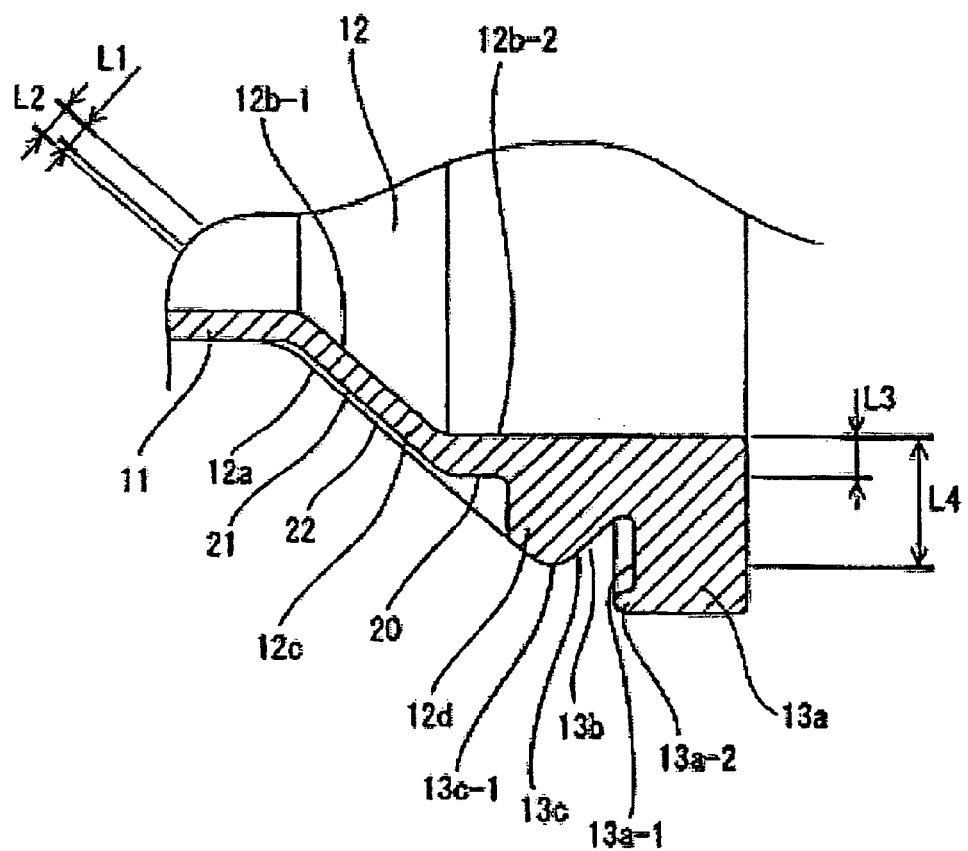
FIG. 5 is a cross-sectional view of a portion of the grommet of FIG. 2.

As shown in FIG. 4, the internal circular face 12b of the funnel-shaped portion 12 is not inclined regularly from the enlarged end to the narrowed end of the funnel-shaped portion 12. A first internal face 12b-1 extending from the narrowed end to approximately half the length along the axis of the frusto-conical wall is inclined, giving a thin wall section 12c having a constant wall thickness. A second internal face 12b-2 extending from the half-length point to the enlarged end has a uniform radius, giving a thick wall section 12d. The above-mentioned deep recess 20 is formed as a notch in the thick wall section 12d.

In the above embodiment, the shallow recess 21 in the thin wall section 12c has a thickness $L_1$ of about 1.5 mm, while the protrusion 22 in the thin wall section 12c has a thickness $L_2$ of about 2.0 mm. On the other hand, the deep recess 20 in the thick wall section 12d has a thickness $L_3$ of about 2.0 mm, while the circular ridgeline 13c-1 has a thickness $L_4$ of about 6.5 mm. In other words, the thickness $L_3$ of the deep recess 20 is the same as thickness $L_2$ of the protrusion 22. Further, the thickness $L_3$ of the deep recess 20 is about 31% of the thickness $L_4$ of the circular ridgeline 13c-1. As shown in FIG. 2, the tubular portion 11 is provided with longitudinal notches 11a that extend from the tubular portion end towards the narrowed end of the funnel-shaped portion 12.

The grommet 10 is installed into the body panel in the following manner.

The wire harness W/H is first passed through the tubular portion 11, then the inside space of the funnel-shaped portion 12. The wire harness W/H and the end section of the tubular portion 11 are then fixed with a tape.

Figure 6A:
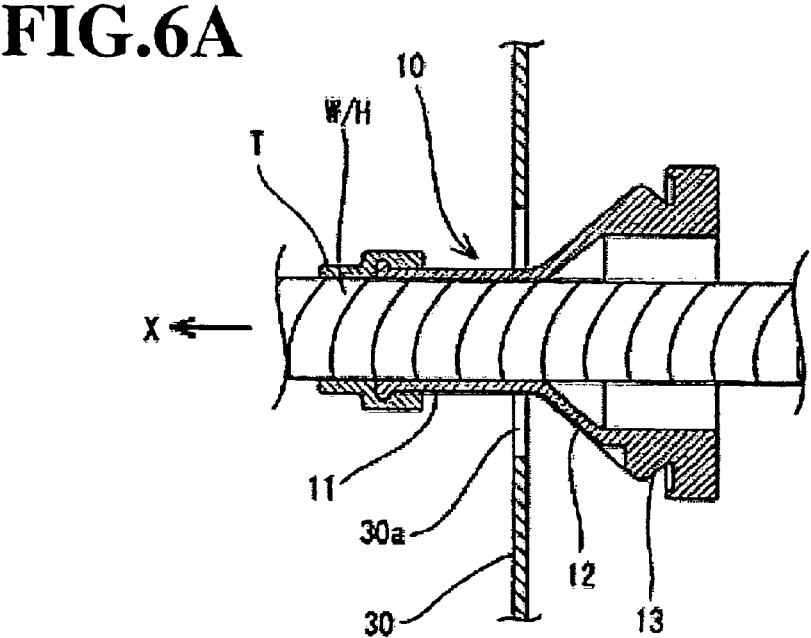
FIGS. 6A and 6B illustrate how the grommet of the first embodiment is inserted into the through-hole of the body panel.
Figure 6B:
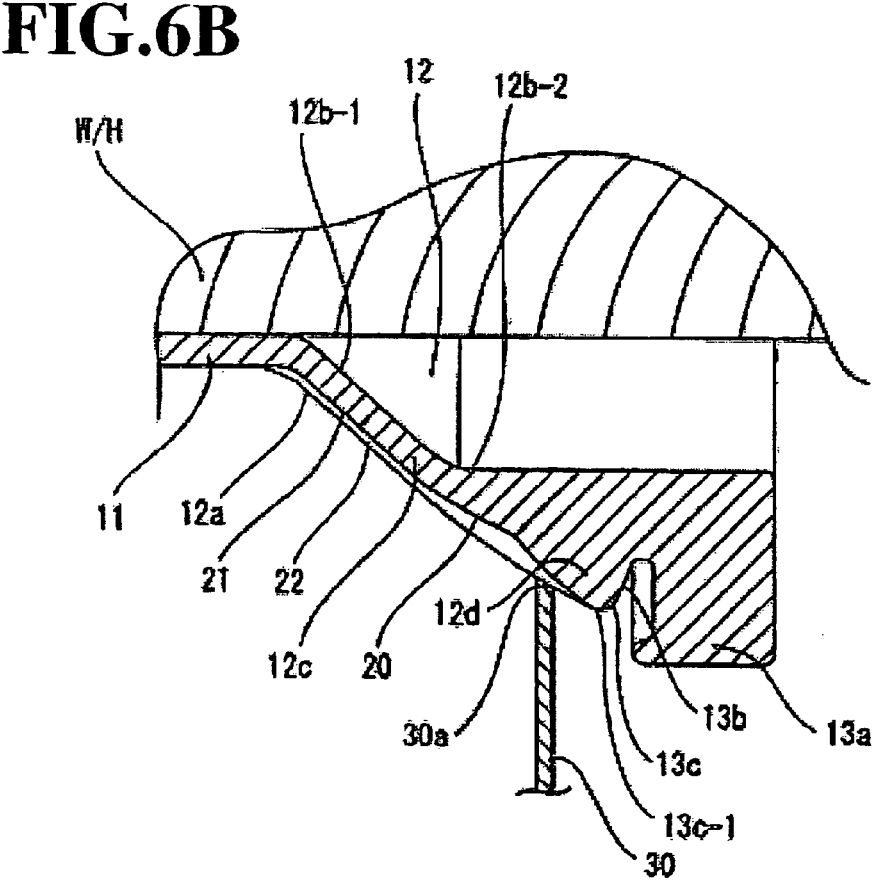
Figure 7:
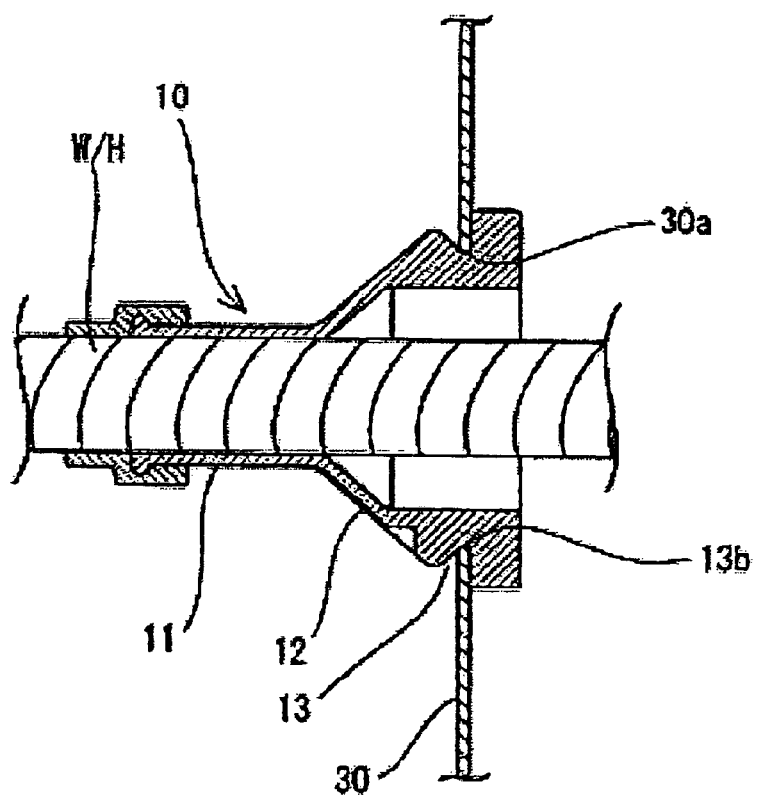
FIG. 7 is a side view showing when the grommet of the invention is installed in the through-hole.

As shown in FIG. 6A, the tubular portion 11 equipped with the wire harness W/H is passed into the through-hole 30a of a body panel 30, and the grommet 10 is pulled towards the direction indicated by the arrow X. Then, as shown in FIG. 6B, the funnel-shaped portion 12 is squashed inwardly by the peripheral rim of the through-hole 30a. When the circular ridgeline 13c-1 of the circular groove portion 13 comes close to the peripheral rim of the through-hole 30a, the funnel-shaped portion 12 receives a strong squashing force. Then, the funnel-shaped portion 12 is easily deformed to be squashed inwardly, by virtue of the flexing of the deep recess 20. Moreover, the funnel-shaped portion 12 is squashed uniformly throughout the circumferential direction, by virtue of the deep recess 20 continuously leading to the shallow recess 21. In particular, the thick wall section 12d is easily squashed by virtue of the deep recess 20 provided therein. Thus, in a state where the enlarged end side of the funnel-shaped portion 12 is deformed inwardly, the circular ridgeline 13c-1 rides on the peripheral rim of the through-hole 30a. Then, the peripheral rim falls from the circular ridgeline 13c-1 towards and into the circular groove portion 13. As shown in FIG. 7, the peripheral rim is held and clasped by the first circular wall section 13a which rises perpendicular to the grommet axis and the second circular wall section 13c concentrically tapered from this ridgeline towards the first circular wall section 13a.

When the peripheral rim of the through-hole 30a comes into contact with the external face 12a of the funnel-shaped portion 12 while the grommet 10 is being inserted into the through-hole 30a, it rubs against the protrusions 22. Since the surface of the protrusions 22 is smaller than that of funnel-shaped portion 12 without protrusion, resistance due to contact friction is lowered and the insertion force for the grommet 10 can be reduced.

As can be understood from above, the deep recess 20 is formed in the thick wall section 12d, and the shallow recess 21 is formed contiguously to the deep recess 20. In such structure, when the grommet 10 is installed into the through-hole 30a of the body panel 30, the deep recess 20 can be squashed inwardly although the circular groove portion 13 and its perimeter are located in the thick wall section 12d. Thus, the force required to insert the grommet 10 can be reduced. Further, since the protrusions 22 remaining between the deep or shallow recesses 20 and 21 form a thick wall section, only the latter rubs against the peripheral rim of the through-hole 30a. The friction surface can thus be reduced, resulting in the lowered insertion force for grommet installation.

On the other hand, once the circular groove portion 13 is fitted with the through-hole 30a, the thick wall section 12d, contiguous with the circular groove portion 13, serves to reinforce the holding force of the latter. Even if the wire harness W/H wrapped in the grommet 10 is subjected to a pulling force, the circular groove portion 13 cannot be detached easily from the through-hole 30a.

Figure 8:
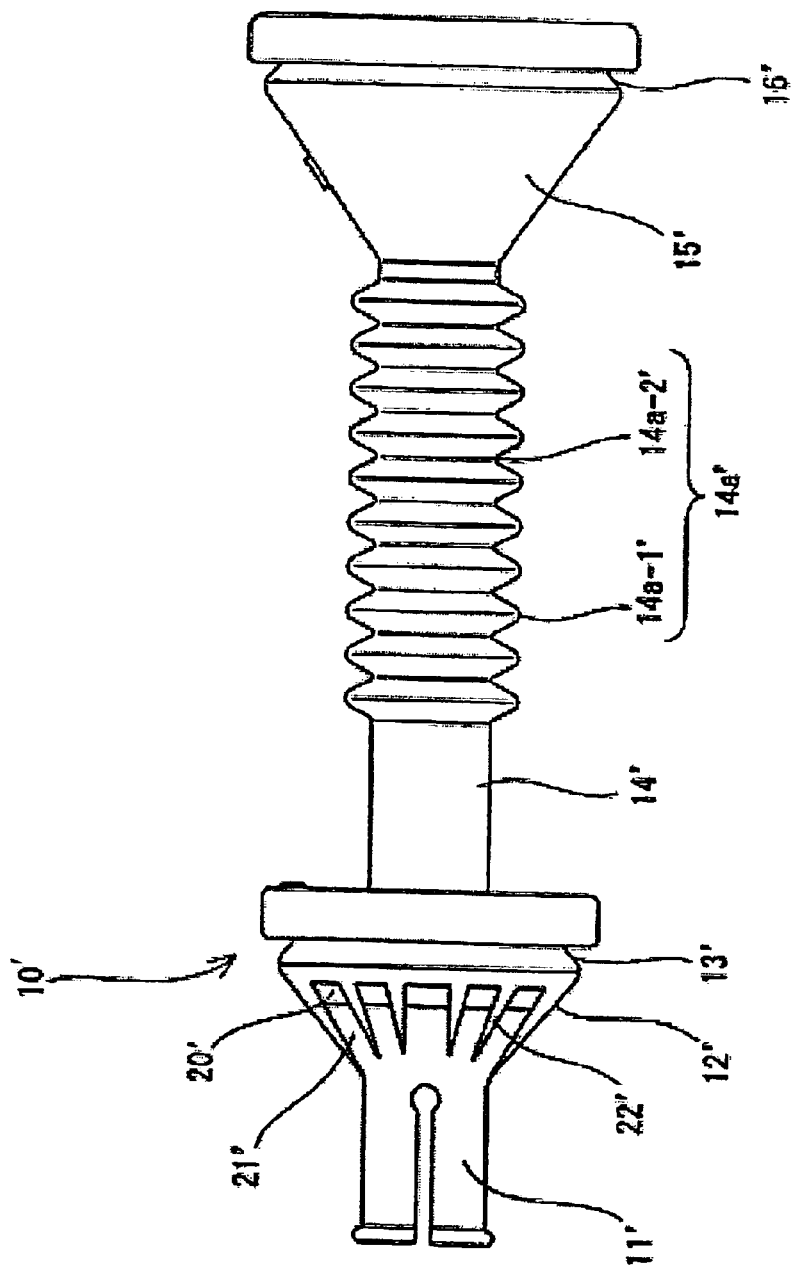
FIG. 8 is a side view of a grommet according to a second embodiment of the invention.
Figure 9:
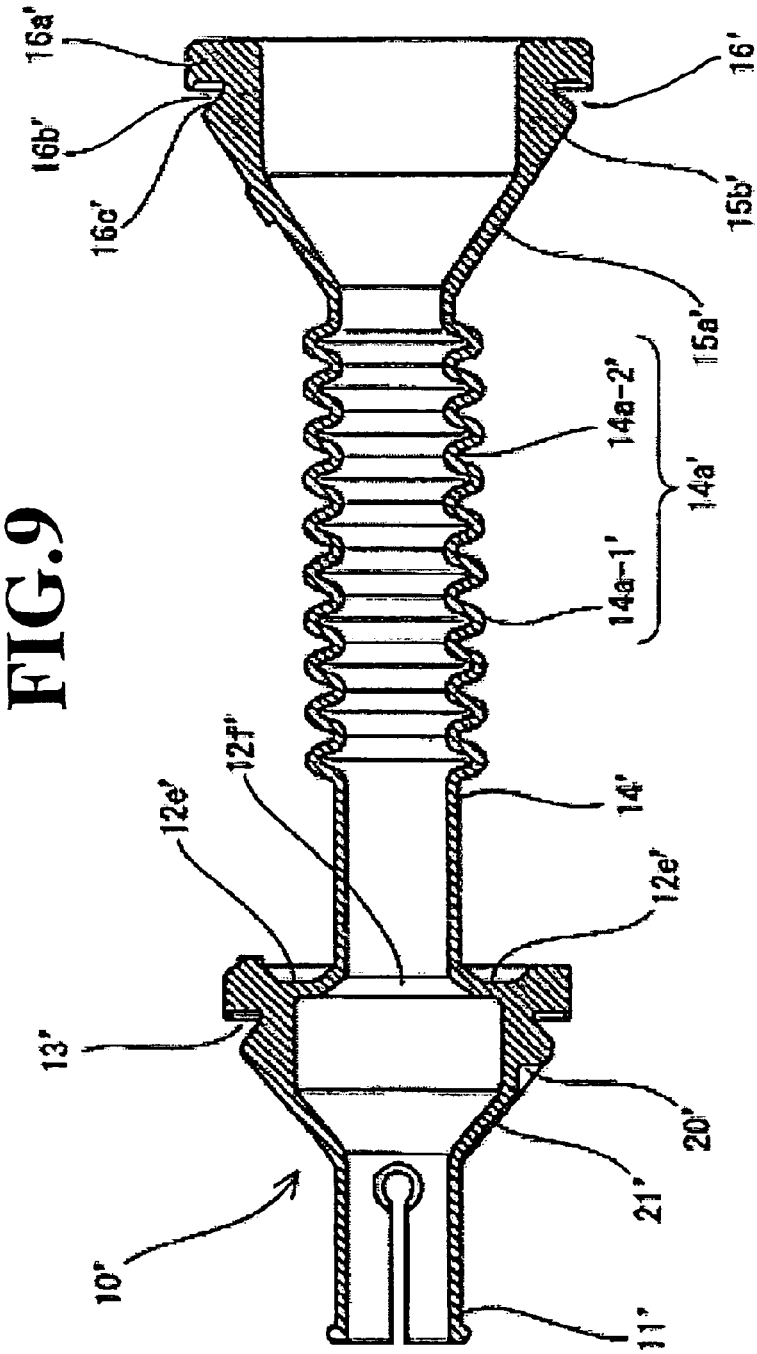
FIG. 9 is a side view of the longitudinal cross-sectional of the grommet of FIG. 8.

FIGS. 8 to 10 show a second embodiment of the invention.

The grommet 10' of the second embodiment is integrally formed of any suitable material, such as rubber or an elastomer, and is used to wrap a wire harness W/H to be installed between a body panel of a vehicle and a door panel thereof.

The grommet 10' includes, sequentially from one side: a first tubular portion 11', a first funnel-shaped portion 12', a second tubular portion 14' and a second funnel-shaped portion 15'. The enlarged end sections of the first and second funnel-shaped portions 12' and 15' are provided, respectively, with circular groove portions 13' and 16'.

The first tubular portion 11' and the first funnel-shaped portion 12' have shapes substantially corresponding to those of the tubular portion 11 and the funnel-shaped portion 12 of the first embodiment, respectively. The external face of the first funnel-shaped portion 12' is provided with deep recesses 20' and shallow recesses 21' arranged at a given interval in the circumferential direction and extending radially, as in the case of the first embodiment. The remaining part of the external face thereof then forms protrusions 22'.

The enlarged end of the first funnel-shaped portion 12' forms a closed face 12e' (FIG. 9) that includes an opening 12f' at its substantially central position. From the peripheral rim of this opening 12f there extends the second tubular portion 14', which may be relatively long and include a corrugated portion 14a' including an alternating sequence of ridges 14a-1' and troughs 14a-2' at a portion adjacent to the second funnel-shaped portion 15'.

As shown in FIG. 9, the second funnel-shaped portion 15' has an external face concentrically enlarging up to the enlarged end section. Conversely, the internal face of the second funnel-shaped portion 15' extends concentrically up to about half the distance along the axial direction of the second funnel-shaped portion 15', and from that half way point extends up to the enlarged end section with substantially the same diameter, thereby forming a thin wall section 15a' and a thick wall section 15b'. The external face of the second funnel-shaped portion 15' is smooth and devoid of the recesses provided in the first funnel-shaped portion 12'.

The external face of the enlarged end section of the second funnel-shaped portion 15' includes a second groove portion 16' which has a shape similar to that of the first circular groove portion 13', namely it includes a wall perpendicular to the grommet axis 16a', a groove 16b' and an inclined wall 16c'. Moreover, the end face of the enlarged end section of the second funnel-shaped portion 15' is open.

The grommet 10' of the second embodiment can be applied to the wire harness W/H for doors, and the end section of the first tubular portion 11' and the wire harness W/H are fixed with a tape.

Figure 10A:
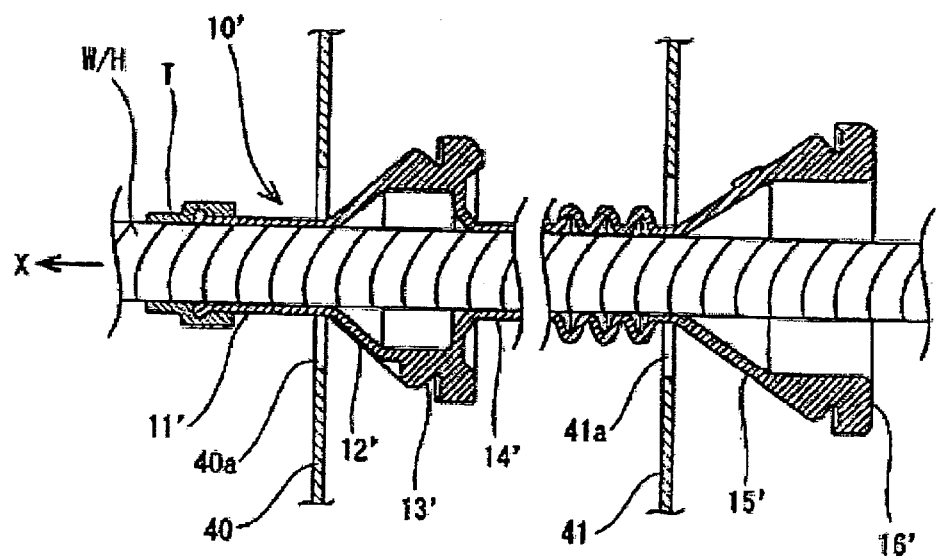
FIGS. 10A and 10B illustrate how the grommet of the second embodiment is inserted into the through-holes respectively of a body panel and a door panel.
Figure 10B:
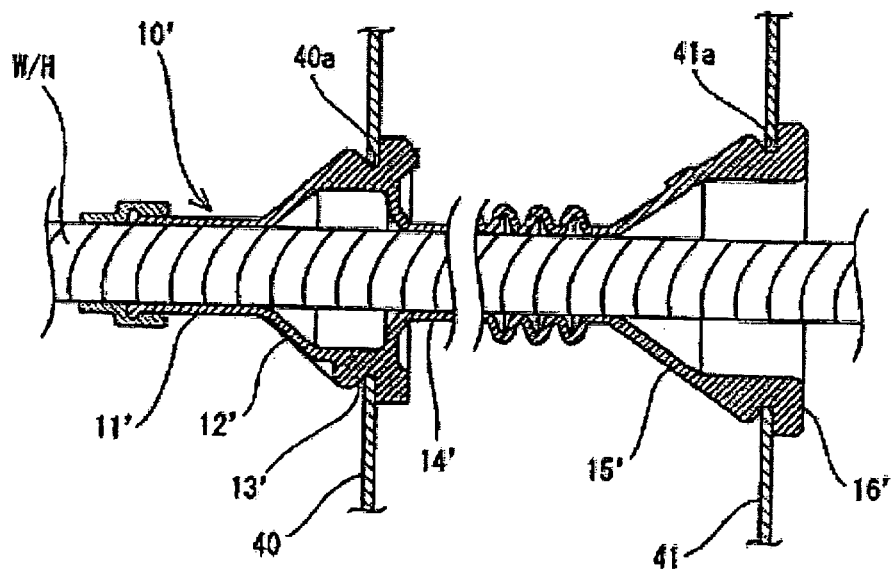

As shown in FIGS. 10A and 10B, the grommet 10' is passed into a through-hole 41' of a door panel 41, then into a through-hole 40a' of a body panel 40. The first circular groove portion 13' of the first funnel-shaped portion 12' is fitted with the through-hole 40a, while the second circular groove portion 16' of the second funnel-shaped portion 15' is fitted with the through-hole 41a. Through-hole 41a is made larger than through-hole 40a, so that the first funnel-shaped portion 12' can be passed smoothly into through-hole 41a.

FIG. 10A shows the state when the first funnel-shaped portion 12' of the grommet 10' is passed into the through-hole 41a of the door panel 41. When the wire harness W/H is pulled in the direction of arrow X in this state, the first funnel-shaped portion 12' fits into through-hole 40a, while the second funnel-shaped portion 15' fits into through-hole 41a.

As in the case of the first embodiment, the first funnel-shaped portion 12' is deformed by the deep recesses 20' and shallow recesses 21', and the first circular groove portion 13' can be inserted into the through-hole 40a with reduced insertion force and clasped therein.

Further, the second circular groove portion 16' of the second funnel-shaped portion 15' can be inserted into through-hole 41a and clasped therein.

In the above structure, the grommet 10' wrapping the wire harness W/H which bridges the body panel 40 to the door panel 41 can be installed in the body panel 40 with reduced insertion force, whereas the body panel 40 can hold the grommet 10' with increased force.

Alternatively, the second funnel-shaped portion may be provided with deep recesses, shallow recesses and protrusions.

As can be understood from above, the funnel-shaped portion of the invention includes a thick wall section that includes deep recesses. When the grommet is being installed, the peripheral rim of the through-hole formed in the body panel reaches the position where it rubs against the external face of the funnel-shaped portion. Then, by virtue of the configuration of the thick wall and deep recesses, the latter is squashed inwardly and consequently the funnel-shaped portion is also squashed inwardly. Further, since the shallow recesses are formed contiguously to the deep recesses, the funnel-shaped portion can be squashed uniformly all over the circular direction. Furthermore, the deep recesses facilitate the squashing of the thick wall section. Thus, the circular ridgeline can ride over the peripheral rim of the through-hole while it is inclined towards the circular groove portion. The groove of the circular groove portion is then fitted in the through-hole of the body panel.

In this manner, though the frusto-conical wall of the funnel-shaped portion is made thick, the insertion force for the grommet can be reduced. Besides, the recesses formed on the external face of the frusto-conical wall leaves thicker protruded portions. When the grommet is being installed, only those protruded portions come into contact with the peripheral rim of the through-hole, instead of the whole surface of the external face of the frusto-conical wall. The insertion force for the grommet is thus reduced considerably.

On the other hand, once the circular groove portion is fitted with the through-hole, the thick wall section that is contiguous to the circular groove portion serves to strengthen restraining force, so that, even if the wire harness is pulled against the grommet, the circular groove portion is prevented from being removed off the through-hole.

When the deep recesses are formed into notches having an L-shape (when viewed on the plane including the axis of the grommet), the portion between these recesses and the circular groove portion can easily be bent towards the groove portion by the confronting peripheral rim of the through-hole, so that insertion force can be reduced.

Further, the narrowed end section of the funnel-shaped portion is provided with a number of shallow recesses, and the thickness of this section is considerably reduced. Accordingly, this part of the funnel-shaped portion tends to squash easily inwardly when the grommet is inserted, without the retaining force of the grommet being weakened. On the other hand, the total surface of the thick protrusions increases towards the circular groove portion, so that the retaining force of this portion is reinforced.

Furthermore, the external face of the frusto-conical wall is inclined from the circular ridgeline towards the tubular portion. Accordingly, when the grommet is inserted into the through-hole, its peripheral rim passes over the ridgeline smoothly, and snugly falls into the circular groove portion.

The grommet of the invention can be used for a wire harness wired between two body panels, e.g. a body panel and a door panel. In particular, when a corrugated section is provided in the second tubular portion and placed between the body panel and the door panel, this section can be flexed conveniently, in accordance with the opening and closing of the door. Although the invention has been described with reference to particular means, materials and embodiments, it is to be understood that the invention is not limited to the particulars disclosed and extends to all equivalents within the scope of the claims.

The present disclosure relates to subject matter contained in priority Japanese Application No. 2003-114388, filed on Apr. 18, 2003, which is herein expressly incorporated by reference in its entirety.

What is claimed:

1. A grommet having an axis and configured to contain a wire harness and insertable into a through-hole formed in a vehicle panel, said grommet comprising a tubular portion and a funnel-shaped portion, said funnel-shaped portion comprising, sequentially from said tubular portion, a narrowed end section, a frusto-conical wall with external and internal faces, and an enlarged end section that comprises an external face provided with a circular groove portion, wherein:

said circular groove portion forms a circular ridgeline at a position nearest to said tubular portion, said frusto-conical wall comprises a thin wall section having a substantially uniform thickness and extending from said narrowed end section up to about a half way position along said axis in said frusto-conical wall, and a thick wall section having a substantially uniform internal radius and extending from said about half way position to and through said enlarged end section along said axis; and said external face of said frusto-conical wall comprises a plurality of shallow recesses which are arranged at given intervals therebetween around the circular direction and which extend in a direction from said narrowed end section towards said circular ridgeline, said shallow recesses leading to deep recesses near said circular ridgeline, whereby protrusions are formed adjacent to said shallow and deep recesses.

2. The grommet according to claim 1, wherein each of said deep recesses has a base extending substantially parallel to said axis and an end wall rising substantially perpendicularly to said axis.

3. The grommet according to claim 1, wherein each of said shallow recesses has substantially the same width along said extending direction, whereby each of said protrusions has a width narrowing towards said tubular portion.

4. The grommet according to claim 2, wherein each of said shallow recesses has substantially the same width along said extending direction, whereby each of said protrusions has a width narrowing towards said tubular portion.

5. The grommet according to claim 1, wherein said circular groove portion has a circular wall which inclines from said circular ridgeline radially inwardly in the direction extending away from said tubular portion.

6. The grommet according to claim 2, wherein said circular groove portion has a circular wall which inclines from said circular ridgeline radially inwardly in the direction extending away from said tubular portion.

7. The grommet according to claim 3, wherein said circular groove portion has a circular wall which inclines from said circular ridgeline radially inwardly in the direction extending away from said tubular portion.

8. The grommet according to claim 4, wherein said circular groove portion has a circular wall which inclines from said circular ridgeline radially inwardly in the direction extending away from said tubular portion.

9. The grommet according to claim 1, wherein said enlarged end section has an end face having a central opening with a peripheral rim; from said rim extends a second tubular portion which has a determined length and comprises a corrugated section along said length, and an end section; from said end section extends a second funnel-shaped portion having a narrowed end section and an enlarged end section having an external face; and wherein said external face is provided with a second circular groove portion, whereby said grommet can contain a wire harness wired between two body panels.

10. The grommet according to claim 2, wherein said enlarged end section has an end face having a central opening with a peripheral rim; from said rim extends a second tubular portion which has a determined length and comprises a corrugated section along said length, and an end section; from said end section extends a second funnel-shaped portion having a narrowed end section and an enlarged end section having an external face; and wherein said external face is provided with a second circular groove portion, whereby said grommet can contain a wire harness wired between two body panels.

11. The grommet according to claim 3, wherein said enlarged end section has an end face having a central opening with a peripheral rim; from said rim extends a second tubular portion which has a determined length and comprises a corrugated section along said length, and an end section; from said end section extends a second funnel-shaped portion having a narrowed end section and an enlarged end section having an external face; and wherein said external face is provided with a second circular groove portion, whereby said grommet can contain a wire harness wired between two body panels.

12. The grommet according to claim 4, wherein said enlarged end section has an end face having a central opening with a peripheral rim; from said rim extends a second tubular portion which has a determined length and comprises a corrugated section along said length, and an end section; from said end section extends a second funnel-shaped portion having a narrowed end section and an enlarged end section having an external face; and wherein said external face is provided with a second circular groove portion, whereby said grommet can contain a wire harness wired between two body panels.

13. The grommet according to claim 5, wherein said enlarged end section has an end face having a central opening with a peripheral rim; from said rim extends a second tubular portion which has a determined length and comprises a corrugated section along said length, and an end section; from said end section extends a second funnel-shaped portion having a narrowed end section and an enlarged end section having an external face; and wherein said external face is provided with a second circular groove portion, whereby said grommet can contain a wire harness wired between two body panels.

14. The grommet according to claim 6, wherein said enlarged end section has an end face having a central opening with a peripheral rim; from said rim extends a second tubular portion which has a determined length and comprises a corrugated section along said length, and an end section; from said end section extends a second funnel-shaped portion having a narrowed end section and an enlarged end section having an external face; and wherein said external face is provided with a second circular groove portion, whereby said grommet can contain a wire harness wired between two body panels.

15. The grommet according to claim 7, wherein said enlarged end section has an end face having a central opening with a peripheral rim; from said rim extends a second tubular portion which has a determined length and comprises a corrugated section along said length, and an end section; from said end section extends a second funnel-shaped portion having a narrowed end section and an enlarged end section having an external face; and wherein said external face is provided with a second circular groove portion, whereby said grommet can contain a wire harness wired between two body panels.

16. The grommet according to claim 8, wherein said enlarged end section has an end face having a central opening with a peripheral rim; from said rim extends a second tubular portion which has a determined length and comprises a corrugated section along said length, and an end section; from said end section extends a second funnel-shaped portion having a narrowed end section and an enlarged end section having an external face; and wherein said external face is provided with a second circular groove portion, whereby said grommet can contain a wire harness wired between two body panels.

17. A wiring harness comprising a group of electrical wires and at least one grommet surrounding a length portion of said group, said grommet comprising an axis and configured to contain a wire harness and being insertable into a through-hole formed in a vehicle panel, said grommet comprising a tubular portion and a funnel-shaped portion, said funnel-shaped portion comprising, sequentially from said tubular portion, a narrowed end section, a frusto-conical wall with external and internal faces, and an enlarged end section that comprises an external face provided with a circular groove portion, wherein:

said circular groove portion forms a circular ridgeline at a position nearest to said tubular portion, said frusto-conical wall comprises a thin wall section having a substantially uniform thickness and extending from said narrowed end section up to a position about half way along said axis in said frusto-conical wall, and a thick wall section having a substantially uniform internal radius and extending from said about half way position to said enlarged end section along said axis; and said external face of said frusto-conical wall comprises a plurality of shallow recesses which are arranged at given intervals therebetween around the circular direction and which extend in a direction from said narrowed end section towards said circular ridgeline, said shallow recesses leading to deep recesses near said circular ridgeline, whereby protrusions are formed adjacent to said shallow and deep recesses.

18. The wiring harness according to claim 17, wherein said enlarged end section has an end face having a central opening with a peripheral rim; from said rim extends a second tubular portion which has a determined length and comprises a corrugated section along said length, and an end section; from said end section extends a second funnel-shaped portion having a narrowed end section and an enlarged end section having an external face; and wherein said external face is provided with a second circular groove portion, whereby said grommet can contain a wire harness wired between two body panels.

19. A method of providing a sealed passage for a wire harness through a panel, comprising:

forming a through-hole in said panel at a location where said sealed passage is to be provided, said through-hole having rim, providing a grommet having an axis and configured to contain said wire harness and being insertable into a through-hole formed in a vehicle panel, said grommet comprising a tubular portion and a funnel-shaped portion, said funnel-shaped portion comprising, sequentially from said tubular portion, a narrowed end section, a frusto-conical wall with external and internal faces, and an enlarged end section that comprises an external face provided with a circular groove portion, wherein:

said circular groove portion forms a circular ridgeline at a position nearest to said tubular portion, said frusto-conical wall comprises a thin wall section having a substantially uniform thickness and extending from said narrowed end section up to a position about half way position along said axis in said frusto-conical wall, and a thick wall section having a substantially uniform internal radius and extending from said about half way position to said enlarged end section along said axis; and said external face of said frusto-conical wall comprises a plurality of shallow recesses which are arranged at given intervals therebetween around the circular direction and which extend in a direction from said narrowed end section towards said circular ridgeline, said shallow recesses leading to deep recesses near said circular ridgeline, whereby protrusions are formed adjacent to said shallow and deep recesses, passing said wire harness through said axis of said grommet, passing said grommet into said through-hole from a face of said panel, with said tubular portion entering first, until said circular groove portion engages with said rim.

20. The method according to claim 19, said method further comprising:

providing said enlarged end section with an end face having a central opening with a peripheral rim, wherein:

from said rim extends a second tubular portion which has a determined length and comprises a corrugated section along said length, and an end section; from said end section extends a second funnel-shaped portion having a narrowed end section and an enlarged end section having an external face; and providing said external face with a second circular groove portion, whereby said grommet can contain a wire harness wired between two body panels.

* * * * *